(12) United States Patent
Hu et al.

(10) Patent No.: US 11,706,618 B2
(45) Date of Patent: Jul. 18, 2023

(54) DATA PACKET VERIFICATION METHOD AND DEVICE

(71) Applicant: HUAWEI TECHNOLOGIES CO., LTD., Guangdong (CN)

(72) Inventors: Li Hu, Shanghai (CN); Jing Chen, Shanghai (CN); Huan Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 273 days.

(21) Appl. No.: 16/678,314

(22) Filed: Nov. 8, 2019

(65) Prior Publication Data

US 2020/0092722 A1 Mar. 19, 2020

Related U.S. Application Data

(63) Continuation of application No. PCT/CN2017/083623, filed on May 9, 2017.

(51) Int. Cl.
*H04W 12/06* (2021.01)
*H04W 12/12* (2021.01)

(52) U.S. Cl.
CPC .......... *H04W 12/06* (2013.01); *H04W 12/12* (2013.01)

(58) Field of Classification Search
CPC ... H04W 12/069; H04W 12/06; H04W 12/12; H04L 63/08; H04L 9/32; H04L 63/0823
See application file for complete search history.

(56) References Cited

U.S. PATENT DOCUMENTS

| 9,654,462 | B2 * | 5/2017 | Burch ................. H04W 12/069 |
| 10,171,463 | B1 * | 1/2019 | Wiger ..................... H04L 63/08 |
| 10,785,652 | B1 * | 9/2020 | Ravindranath ....... H04W 12/48 |
| 11,375,024 | B1 * | 6/2022 | Waters ................... H04L 47/20 |
| 2003/0093681 | A1 | 5/2003 | Wettstein |

(Continued)

FOREIGN PATENT DOCUMENTS

| CN | 101351027 A | 1/2009 |
| CN | 101662458 A | 3/2010 |

(Continued)

OTHER PUBLICATIONS

M. S. Siddiqui et al., "Policy based virtualised security architecture for SDN/NFV enabled 5G access networks," 2016 IEEE Conference on Network Function Virtualization and Software Defined Networks (NFV-SDN), Palo Alto, CA, USA, 2016, pp. 44-49. (Year: 2016).*

(Continued)

*Primary Examiner* — Kari L Schmidt (57) ABSTRACT

A data packet verification method and a device improve network security. The method includes: receiving a data packet of a terminal device, where the data packet carries a first token and a service identifier, and the service identifier is used to indicate a type of a service to which the data packet belongs; obtaining first input information based on the data packet, and generating a second token based on the first input information, where the first input information includes an identifier of the terminal device and the service identifier carried in the data packet; and sending the data packet when the first token is the same as the second token.

19 Claims, 5 Drawing Sheets

(56) References Cited

U.S. PATENT DOCUMENTS

| | | | | |
|---|---|---|---|---|
| 2004/0177369 | A1* | 9/2004 | Akins, III | H04N 21/4147 380/278 |
| 2006/0034179 | A1* | 2/2006 | Carter | H04L 45/34 370/241 |
| 2007/0118886 | A1* | 5/2007 | Martin | H04L 63/0435 726/5 |
| 2008/0141027 | A1* | 6/2008 | Kim | H04L 9/3218 713/156 |
| 2013/0244614 | A1* | 9/2013 | Santamaria | H04W 12/069 455/411 |
| 2014/0245411 | A1* | 8/2014 | Meng | H04L 63/08 726/7 |
| 2014/0337633 | A1 | 11/2014 | Yang et al. | |
| 2016/0105881 | A1* | 4/2016 | Kim | H04L 61/5007 455/450 |
| 2016/0127902 | A1* | 5/2016 | Ciarniello | H04L 63/18 380/247 |
| 2016/0248682 | A1* | 8/2016 | Lee | H04L 67/146 |
| 2016/0248686 | A1* | 8/2016 | Lee | H04L 45/38 |
| 2016/0344635 | A1* | 11/2016 | Lee | H04L 47/20 |
| 2017/0149740 | A1* | 5/2017 | Mansour | H04L 63/061 |
| 2017/0332421 | A1* | 11/2017 | Sternberg | H04L 41/0896 |
| 2018/0103363 | A1* | 4/2018 | Faccin | H04W 8/005 |
| 2018/0270888 | A1* | 9/2018 | Faccin | H04W 76/15 |
| 2019/0116179 | A1 | 4/2019 | Xu | |
| 2019/0200228 | A1* | 6/2019 | Adrangi | H04W 12/0431 |
| 2020/0329016 | A1* | 10/2020 | Aceto | G06F 21/602 |
| 2020/0366484 | A1* | 11/2020 | So | H04L 9/0825 |
| 2022/0191697 | A1* | 6/2022 | Arngren | H04W 8/082 |
| 2022/0400375 | A1* | 12/2022 | Schmitt | H04W 12/63 |

FOREIGN PATENT DOCUMENTS

| | | |
|---|---|---|
| CN | 101754215 A | 6/2010 |
| CN | 104579694 A | 4/2015 |
| CN | 106603461 A | 4/2017 |

OTHER PUBLICATIONS

S. Behrad, E. Bertin and N. Crespi, "Securing authentication for mobile networks, a survey on 4G issues and 5G answers," 2018 21st Conference on Innovation in Clouds, Internet and Networks and Workshops (ICIN), Paris, France, 2018, pp. 1-8. (Year: 2018).*

Neetesh Saxena, Santiago Grijalva, and Narendra S. Chaudhari. 2016. Authentication Protocol for an IoT-Enabled LTE Network. ACM Trans. Internet Technol. 16, 4, Article 25 (Dec. 2016), 20 pages (Year: 2016).*

3GPP TR 23.799 V14.0.0 (Dec. 2016), Technical Report, 3rd Generation Partnership Project;Technical Specification Group Services and System Aspects; Study on Architecture for Next Generation System (Release 14), (522 pages).

International Search Report for PCT/CN2017/083623, dated Nov. 29, 2017, 4 pages.

\* cited by examiner

DATA PACKET VERIFICATION METHOD AND DEVICE

CROSS-REFERENCE TO RELATED APPLICATIONS

This application is a continuation of International Application No. PCT/CN2017/083623, filed on May 9, 2017, the disclosure of which is hereby incorporated by reference in its entirety.

TECHNICAL FIELD

Embodiments of the present application relate to the field of mobile communications technologies, and in particular, to a data packet verification method and a device.

BACKGROUND

In a long term evolution (LTE) network, to ensure security of a communications network, legality verification on an access device is implemented by using a token. For example, a core network (CN) device randomly generates a token, and sends the generated token to a terminal device and a server. A data packet transmitted between the terminal device and the server may carry the token, and the CN device attempts to verify legality of the terminal device or the server based on the token carried in the data packet sent by the terminal device or the server.

In the foregoing manner, the token is randomly generated by the CN device. Therefore, as long as an attacker steals the token and sends the token to the CN device, verification of the attacker by the CN device succeeds. As a result, the attacker may disguise as a stolen device to perform an activity such as fraud, thereby reducing security of the communications network.

SUMMARY

Embodiments of the present application provide a data packet verification method and a device, to improve network security.

According to a first aspect, a data packet verification method is provided. The method may be implemented by a user plane function entity, and the user plane function entity is, for example, a UPF. The method includes: receiving a data packet of a terminal device, where the data packet carries a first token and a service identifier, and the service identifier is used to indicate a type of a service to which the data packet belongs; obtaining first input information based on the data packet, and generating a second token based on the first input information, where the first input information includes an identifier of the terminal device and the service identifier; and sending the data packet when the first token is the same as the second token.

In this embodiment of the present application, during attempt to verify the data packet sent by the device, a token is generated based on the identifier of the terminal device and the service identifier, and whether the device is legal is determined by comparing whether the generated token is consistent with the token carried in the data packet. To be specific, the token is associated with the identifier of the terminal device and the service identifier, and the verification fails as long as one of the token, the identifier of the terminal device, and the service identifier is incorrect. Therefore, even if an attacker steals the token, as the attacker cannot obtain the identifier of the terminal device and the service identifier that are legal, the verification still fails. As a result, the attacker cannot disguise as a legal device to perform an attack. It can be learned that the technical solution provided in this embodiment of the present application enhances the network security, and improves network assurance.

In a possible design, the service identifier includes service type indication information and an identifier of a server. The identifier of the server is used to indicate the server that provides the service for the terminal device, and the service type indication information is used to indicate the type of the service to which the data packet belongs.

That is, the identifier of the server and the service type indication information may be obtained by using the service identifier, that is, a relatively large quantity of information is carried by using limited resources. In addition, when the second token is generated, the service identifier is used as input information, that is, the token is associated with the identifier of the server and the service type, thereby further enhancing security and reliability of the token.

In a possible design, before receiving the data packet of the terminal device, the UPF may first generate the first token, that is, the first token is first generated before the first token is used. A method for generating the first token is as follows: obtaining second input information, where the second input information includes the identifier of the terminal device and the service identifier; generating the first token based on the second input information; and sending the generated first token to the terminal device and the server that provides the service for the terminal device.

The first token is generated based on the identifier of the terminal device and the service identifier that are obtained. To be specific, the token is associated with the identifier of the terminal device and the service identifier, and subsequent verification fails as long as one of the token, the identifier of the terminal device, and the service identifier is incorrect. Therefore, even if an attacker steals the token, as the attacker cannot obtain the identifier of the terminal device and the service identifier that are legal, the verification still fails. As a result, the attacker cannot disguise as a legal device to perform attack, thereby enhancing the network security.

In a possible design, the second input information further includes a random number, and the first input information further includes the random number; or the second input information further includes a third token, and the first input information further includes the third token, and the third token is generated by the terminal device; or the second input information further includes a fourth token, and the first input information further includes the fourth token, and the fourth token is generated by the server that provides the service for the terminal device; or the second input information further includes the third token and the fourth token, and the first input information further includes the third token and the fourth token; or the second input information further includes the random number, the third token, and the fourth token, and the first input information further includes the random number, the third token, and the fourth token; or the second input information further includes the random number and the third token, and the first input information further includes the random number and the third token; or the second input information further includes the random number and the fourth token, and the first input information further includes the random number and the fourth token.

The second input information is input information used to generate the first token, and the first input information is input information used to generate the second token. Therefore, a category of a parameter included in the first input information needs to be the same as a category of a parameter included in the second input information, and a quantity of parameters included in the first input information further needs to be the same as a quantity of parameters included in the second input information, so that the verification may be completed by comparing the first token with the second token. In addition to the identifier of the terminal device and the service identifier, some parameters are further included, for example, the random number, the third token, and the fourth token. In addition to the identifier of the terminal device and the service identifier, the input information may further include any one or more of the foregoing parameters. Therefore, a category and a quantity of additional parameters included in the second input information need to be the same as a category and a quantity of additional parameters included in the first input information. For example, if the second input information includes the random number, the first input information further needs to include the random number, if the second input information does not include the third token, the first input information cannot include the third token either. Therefore, this manner ensures that a basic verification error is avoided.

In a possible design, if the input information includes the random number, the UPF needs to first obtain the random number to generate the token. The UPF may obtain the random number based on the identifier of the terminal device, or may obtain the random number based on the service identifier.

For example, the UPF may generate the random number based on the identifier of the terminal device, so that the UPF may generate different random numbers for identifiers of different terminal devices. Alternatively, the UPF may maintain one random number for an identifier of each terminal device. For example, the UPF pre-stores a mapping relationship between an identifier of a terminal device and a random number. Therefore, when generating the first token, the UPF may search, based on the stored mapping relationship, for a random number corresponding to the identifier of the terminal device, and this manner is relatively simple. In this manner, each terminal device obtains a different first token, thereby improving the reliability of the token.

Alternatively, the UPF may generate the random number based on the service identifier. In this way, the UPF may generate different random numbers for different service identifiers. Alternatively, the UPF may maintain one random number for each service identifier. For example, the UPF pre-stores a mapping relationship between a service identifier and a random number. Therefore, when generating the first token, the UPF may search, based on the stored mapping relationship, a random number corresponding to the service identifier, and this manner is relatively simple. In this manner, each service identifier corresponds to a different first token, thereby improving the reliability of the token.

In a possible design, the data packet is discarded when the first token is different from the second token.

If the first token is different from the second token, the first token is very likely to be stolen, that is, the device that sends the data packet is an illegal device. In this case, the UPF may discard the data packet, to protect the network security and avoid being attacked by an illegal user.

In a possible design, after the generating the first token based on the second input information, the first token may further be stored. Therefore, the generating a second token based on the first input information includes: when the stored first token is the same as the first token carried in the data packet, generating the second token based on the first input information.

To reduce load of the UPF as much as possible, if the UPF further stores the first token after generating the first token, the UPF may further perform preliminary verification once before generating the second token. For example, after receiving the data packet, the UPF first compares the stored first token with the first token stored in the data packet, to determine whether the stored first token and the first token stored in the data packet are the same. If the stored first token is different from the first token carried in the data packet, the first token carried in the data packet may be basically determined as incorrect, where the error may be caused in a transmission process, or the device that sends the data packet may steal the token, that is, the device that sends the data packet may be an illegal device. In this case, the UPF may directly determine that the verification fails without generating the second token. A simple preliminary verification process is added, so that the UPF may preliminarily determine whether the device that sends the data packet is legal, and workload of the UPF may be reduced to some extent.

According to a second aspect, a communications apparatus is provided. The communications apparatus has functions for implementing the UPF in the foregoing method designs. The functions may be implemented by using hardware, or may be implemented by executing corresponding software by hardware. The hardware or the software includes one or more units corresponding to the foregoing functions.

In a possible design, a specific structure of the communications apparatus may include a receiving unit, a processing unit, and a sending unit. The receiving unit, the processing unit, and the sending unit may perform corresponding functions in the method according to the first aspect or any possible design of the first aspect.

According to a third aspect, a communications apparatus is provided. The communications apparatus may be a UPF, or a function module such as a chip disposed in the UPF. The communications apparatus includes: a memory, configured to store computer executable program code; a communications interface; and a processor, where the processor is coupled to the memory and the communications interface. The program code stored in the memory includes an instruction, and when the processor executes the instruction, the instruction enables the communications apparatus to perform the method performed by the UPF according to the first aspect or any possible design of the first aspect.

According to a fourth aspect, a computer storage medium is provided. The computer storage medium is configured to store a computer software instruction used by the communications apparatus described in the second aspect or the communications apparatus described in the third aspect, and includes a program designed for the UPF to perform the method according to the first aspect or any possible design of the first aspect.

According to a fifth aspect, a computer program product including an instruction is provided. When running on a computer, the computer program product enables the computer to perform the method according to the first aspect or any possible design of the first aspect.

In the embodiments of the present application, whether the device that sends the data packet is legal is verified based on the token, and the token is associated with the identifier of the terminal device and the service identifier. Even if an attacker steals the token, as the attacker cannot obtain the identifier of the terminal device and the service identifier that are legal, the verification still fails. Therefore, the network security is enhanced, and the network assurance is improved.

DESCRIPTION OF EMBODIMENTS

To make the objectives, technical solutions, and advantages of embodiments of the present application clearer, the following further describes the embodiments of the present application in detail with reference to the accompanying drawings.

The solutions described in this specification may be applied to a fifth-generation mobile communications technology (5G) system, or may be applied to a next-generation mobile communications system.

In the following, some terms in the embodiments of the present application are described, to help a person skilled in the art have a better understanding.

Figure 1:
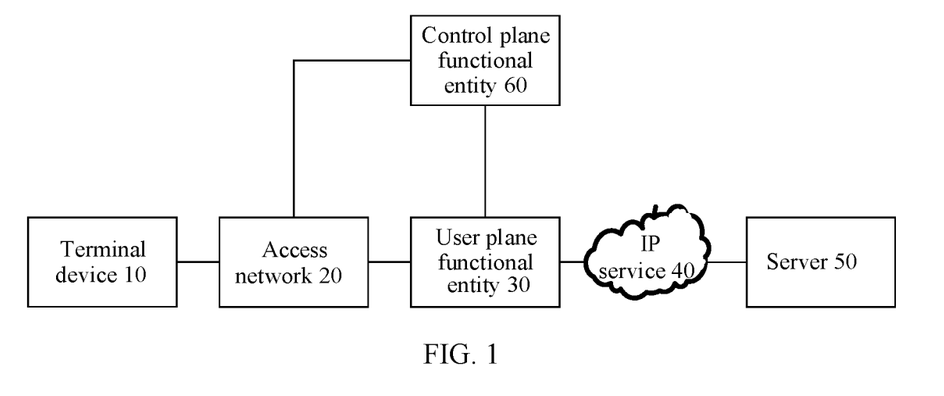
FIG. 1 is a schematic diagram of an application scenario according to an embodiment of the present application.

(1) A user plane function entity 30, for example, is represented as a user plane-core network (UP-CN), and is configured to implement a function of a user plane in a core network, where the function includes data packet forwarding and the like. The user plane function entity 30 may be implemented by using one actual physical device, or may be implemented by using a plurality of physical devices. For example, an implementation of the user plane function entity 30 is a user plane function (UPF) entity. In this specification, the UPF entity is also referred to as a UPF.

(2) A control plane function entity 60, for example, is represented as a control plane-core network (CP-CN), and is configured to implement a function of a control plane in the core network, where the function includes signaling transmission and the like. The control plane function entity 60 may be implemented by using one actual physical device, or may be implemented by using a plurality of physical devices. For example, an implementation of the control plane function entity 60 is an access and mobility management function (AMF) entity, a session management function (SMF) entity, a security anchor function (SEAF) entity, or an authentication server function (AUSF) entity.

(3) A server 50 includes an application server in the embodiments of the present application, and is configured to provide an application service for a terminal device 10.

(4) A terminal device 10 is a device that provides a user with voice and/or data connectivity, for example, may include a handheld device with a wireless connection function, or a processing device connected to a wireless modem. The terminal device 10 may communicate with a core network by using an access network (AN), and exchange voice and/or data with the AN. The terminal device 10 may include user equipment (UE), a wireless terminal device, a mobile terminal device, a subscriber unit, a subscriber station, a mobile station, a remote station, an access point (AP), a remote terminal device (Remote Terminal), an access terminal device (Access Terminal), a user terminal device (User Terminal), a user agent, a user device, or the like. For example, the terminal device may include a mobile phone (or referred to as a "cellular" phone), a computer having a mobile terminal device, a portable, pocket-sized, handheld, computer-embedded, or in-vehicle mobile apparatus, or a smart wearable device. For example, the terminal device 10 may be a device such as a personal communication service (PCS) phone, a cordless telephone set, a session initiation protocol (SIP) phone set, a wireless local loop (WLL) station, a personal digital assistant (PDA), a smart watch, a smart helmet, smart glasses, or a smart band.

(5) An AN 20 may include a radio access network (Radio Access Network, RAN), and may further include a wired access network. That is, the terminal device 10 may communicate with a core network by using the RAN, or may communicate with the core network by using the wired access network.

If a terminal device 10 communicates with the core network by using the RAN, the terminal device may specifically communicate with the core network by using a base station (for example, an access point). The base station may be a device that communicates with a wireless terminal device on an air interface in the access network by using one or more sectors. The base station may be configured to mutually convert a received over-the-air frame and a received Internet Protocol (IP) packet, and serve as a router between the terminal device and a rest part of the access network, where the rest part of the access network may include an IP network. The base station may further coordinate attribute management of the air interface. For example, the base station may include an evolved Node B (NodeB, or eNB, or eNodeB, evolved Node B) in an LTE system or an LTE-advanced (LTE-A) system, or may further include a gNB in a 5G system. This is not limited in the embodiments of the present application.

(6) The terms "system" and "network" may be used interchangeably in the embodiments of the present application. The term "a plurality of" refers to two or more. In view of this, "a plurality of" may further be understood as "at least two" in the embodiments of the present application. The term "and/or" describes an association relationship of associated objects, and represents that three relationships may exist. For example, A and/or B may represent the following three cases: only A exists, both A and B exist, and only B exists. In addition, the character "/", unless otherwise specified, generally represents an "or" relationship between the associated objects. In addition, it should be understood that, in the description of the embodiments of the present application, the words "first", "second", and the like are merely used for distinguishing descriptions, and shall not be understood as an indication or implication of relative importance, or an indication or implication of an order.

An application scenario in an embodiment of the present application is first described.

FIG. 1 is a diagram of a network architecture of a 5G system, and is also a schematic diagram of an application scenario according to an embodiment of the present application. It can be learned from FIG. 1 that a terminal device 10 communicates with a core network by using an access network 20, where a core network device includes a control plane function entity 60 and a user plane function entity 30, and the terminal device performs signaling interaction with the control plane function entity by using the access network, and performs data interaction with the user plane function entity by using the access network. The user plane function entity 30 is connected to an IP service network 40, the IP service network is further connected to a server, and the server may provide an application service for the terminal device.

The following describes the technical solutions provided in the embodiments of the present application with reference to the accompanying drawings. In the following description process, for example, the technical solutions provided in the embodiments of the present application are applied to the application scenario shown in FIG. 1.

Figure 2:
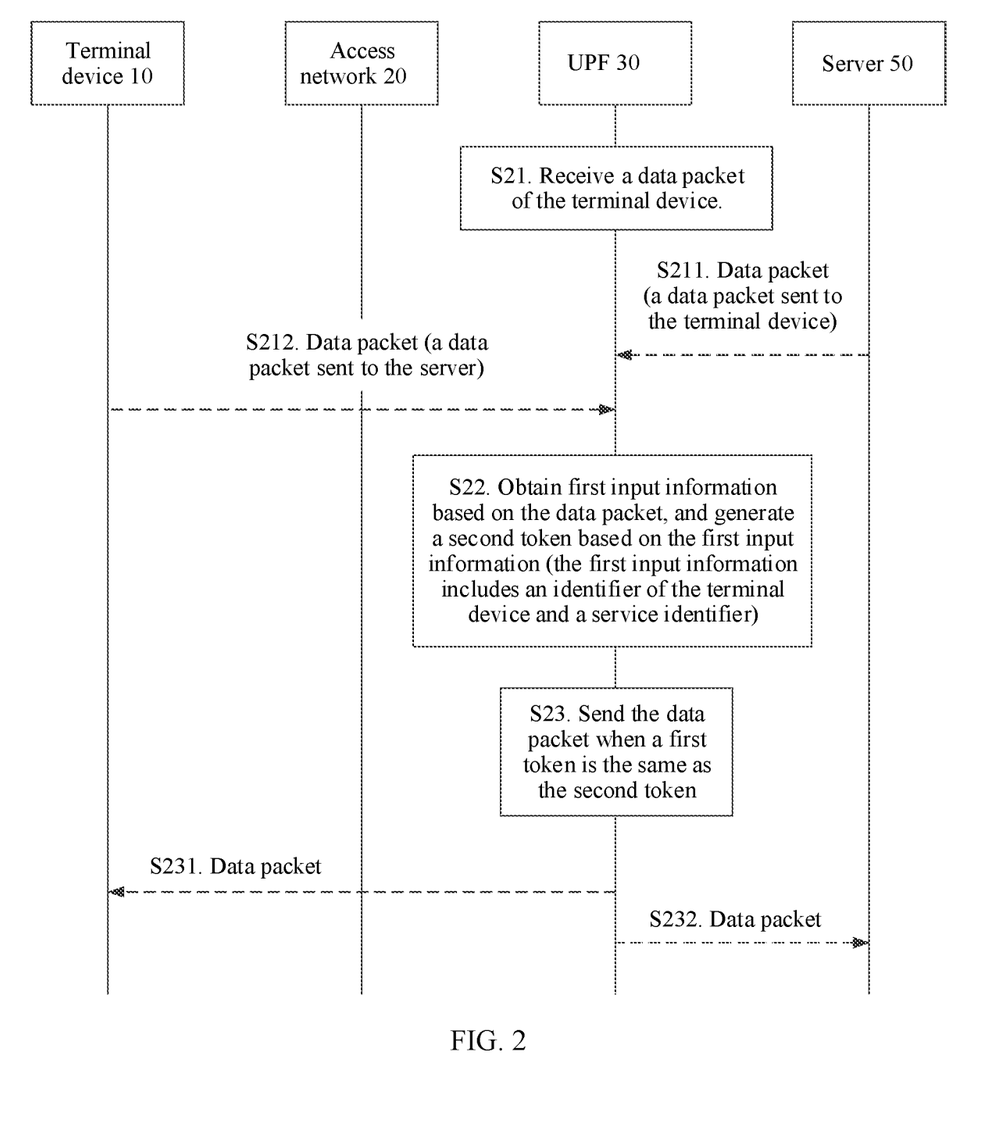
FIG. 2 is a flowchart of a data packet verification method according to an embodiment of the present application.

Referring to FIG. 2, an embodiment of the present application provides a data packet verification method, where the method may be implemented by a user plane function entity 30 of a core network.

S21. Receive a data packet of a terminal device 10.

In an example, the data packet of the terminal device 10 may be a data packet sent by a server 50 to the terminal device. In this case, for a specific implementation of S21, refer to S211 in FIG. 2, that is, the server 50 sends the data packet to the terminal device 10.

In another example, the data packet of the terminal device 10 may further be a data packet sent by the terminal device 10 to the server 50. In this case, for a specific implementation of S21, refer to S212 in FIG. 2, that is, the terminal device 10 sends the data packet to the server 50.

S211 and S212 are optional manners in which the UPF 30 obtains the data packet of the terminal device 10. Therefore, arrows used to indicate S211 and S212 are drawn in dashed lines in FIG. 2.

It should be noted that the solution provided in this embodiment of the present application may be applied to a process in which the server 50 sends the data packet to the terminal device 10, or may be applied to a process in which the terminal device sends the data packet to the server. In addition, because the data packet communicated between the terminal device 10 and the server 50 is forwarded by the access network and the UPF, both the data packet sent by the server to the terminal device and the data packet sent by the terminal device to the server first arrive at the UPF before arriving at a destination device, so that the UPF receives the data packet of the terminal device.

The data packet may carry a first token and a service identifier (Service ID).

Specifically, the service identifier may include service type indication information and an identifier of the server 50. The service type indication information may be used to indicate the type of the service to which the data packet belongs, for example, used to indicate an encrypted service. The identifier of the server 50 is used to indicate the server that provides the terminal device with the service to which the data packet belongs. For example, when one server provides a service for the terminal device, the service identifier may include an identifier of the server. When a plurality of servers 50 provide services for the terminal device, the service identifier may include identifiers of the plurality of servers.

Specifically, the first token may be a token generated by the UPF 30. That is, the UPF 30 generates the first token in advance, and sends the first token to the terminal device 10 and the server 50. After receiving the first token sent by the UPF 30, the server 50 and the terminal device 10 add the first token to the data packet in a communication process, so that the UPF 30 attempts to verify legality of the terminal device 10 or the server 50 based on the first token. Certainly, the server 50 and the terminal device 10 may add the first token to each data packet in a current session process, and the UPF 30 needs to attempt to verify each data packet communicated by the server 50 and the terminal device 10, to improve security of the communication process. Alternatively, the server and the terminal device 10 may add the first token merely to a first data packet or some selected data packets in the current session process, and the UPF merely needs to attempt to verify these data packets, so that workload of the UPF is reduced, a data volume of the data packet is reduced, and transmission resources are saved. A process in which the UPF 30 generates the first token is described in a subsequent embodiment.

Optionally, the data packet further includes an identifier (ID) of the terminal device 10. The identifier of the terminal device 10 may be an Internet Protocol (IP) address of the terminal device, or a permanent subscription identifier of the terminal device, for example, an international mobile subscriber identity (IMSI) or a subscriber permanent identifier (SUPI), or may be a temporary subscription identifier of the terminal device, for example, a globally unique temporary identity (GUTI) or a temporary user identity (Temporary User ID).

S22. Obtain first input information based on the data packet, and generate a second token based on the first input information.

The first input information includes the identifier of the terminal device 10 and the service identifier. As the service identifier includes the service type indication information and the identifier of the server, and the service identifier and the identifier of the terminal device are used as parameters for generating the token, association between the terminal device, the server, and the service is implemented. In this way, another terminal device 10 cannot counterfeit the terminal device, thereby resisting a spoof attack.

In an example, if the data packet includes the identifier of the terminal device 10, the obtaining first input information based on the data packet in S22 may be implemented by obtaining the identifier of the terminal device and service identifier from the data packet. For example, if the identifier of the terminal device 10 is an IP address of the terminal device, the UPF 30 may obtain the IP address of the terminal device by directly parsing an IP layer of the data packet.

In another example, if the data packet does not include the identifier of the terminal device 10, the obtaining first input information based on the data packet in S22 may include: obtaining the identifier of the terminal device based on a tunnel identifier or the IP address of the terminal device that is carried in the data packet. For example, if the identifier of the terminal device 10 is the permanent subscription identifier of the terminal device or the temporary subscription identifier of the terminal device 10, the UPF 30 may obtain a corresponding permanent subscription identifier of the terminal device or a corresponding temporary subscription identifier of the terminal device from stored context information by using the tunnel identifier of the data packet.

The generating a second token based on the first input information in S22 may include: generating the second token based on an authentication vector algorithm by using the first input information as an input parameter. The authentication vector algorithm may be a one-way function, for example, a secure hash algorithm (SHA) 1, an SHA256, a message digest algorithm (MD), or a hash-based message authentication code (HMAC). This embodiment of the present application is not limited thereto.

It should be noted that a method of generating the first token may be the same as a method of generating the second token. For example, an authentication vector algorithm used to generate the first token and an authentication vector algorithm used to generate the second token are the same, to avoid verification failure caused by different algorithms. In this case, an input parameter for generating the first token is the same as the first input information. For example, both the input parameter and the first input information are the permanent subscription identifier of the terminal device such as an IMSI, or are the temporary subscription identifier of the terminal device such as a GUTI, so that successful verification is ensured as much as possible.

Optionally, the first input information further includes a salt, and the salt may be a random number. The random number is added to the first input information, so that the generated token is unique and is more difficult to steal.

In an example, after generating the first token, the UPF 30 may store a random number used to generate the first token, and when generating the second token, the UPF may directly obtain the stored random number as the random number included in the first input information.

In another example, a manner in which the UPF 30 obtains the random number in the first input information is the same as a manner in which the UPF obtains the random number used to generate the first token.

For example, if the random number used to generate the first token is obtained by the UPF 30 based on the identifier of the terminal device 10, the UPF may further obtain the random number in the first input information based on the identifier of the terminal device when generating the second token. If the UPF 30 stores the random number used to generate the first token, for example, the UPF pre-stores a mapping relationship between an identifier of a terminal device and a random number, when the UPF needs to obtain the first input information, the UPF may query, based on the identifier of the terminal device and the mapping relationship between an identifier of a terminal device and a random number, the random number corresponding to the identifier of the terminal device 10. If the UPF 30 does not store the random number used to generate the first token, based on the identifier of the terminal device that is indicated by the data packet, the UPF may generate a random number in a generation manner that is the same as that of generating the random number used to generate the first token, and use the generated random number as the random number in the first input information.

For example, if the random number used to generate the first token is obtained by the UPF 30 based on the service identifier, the UPF may further continue to obtain the random number based on the service identifier when generating the second token. If the UPF 30 stores the random number used to generate the first token, and the UPF pre-stores a mapping relationship between a service identifier and a random number, when the UPF needs to obtain the first input information, the UPF may query, directly based on the service identifier carried in the data packet and the mapping relationship between a service identifier and a random number, the random number corresponding to the service identifier. If the UPF 30 does not store the random number used to generate the first token, based on the service identifier carried in the data packet, the UPF may generate a random number in the generation manner that is the same as that of generating the random number used to generate the first token, and use the generated random number as the random number in the first input information.

For another example, if the random number in the first input information is a fixed random number stored by the UPF 30, that is, for an identifier of any terminal device or any service identifier, the UPF uses the random number as the random number used to generate the first token, the UPF may directly query the stored random number, and the random number obtained through query is used as the random number in the first input information.

In this embodiment of the present application, a random number is introduced into input information used to generate the second token, thereby ensuring freshness of a token generated by each new session, reducing cases in which a same token is generated, and effectively resist a replay attack.

Optionally, the first input information further includes a third token, and the third token is generated by the terminal device. The third token is stored in the UPF, and the UPF may obtain the third token through query. Specifically, if the first input information includes the third token, the input parameter used when the first token is generated further includes the third token. For example, after generating the third token, the terminal device may send the third token to the UPF 30, the UPF may use the third token as the input parameter for generating the first token, and the UPF 30 may further store the third token. In this way, when performing verification, the UPF may also use the stored third token as an input parameter for generating the second token. Because the third token is sent by the terminal device to the UPF, when storing the third token, the UPF may perform storage based on the identifier of the terminal device, and certainly may further perform storage based on other information such as the service identifier. Correspondingly, when generating the first token, the UPF 30 may search for the stored third token based on information such as the identifier of the terminal device or the service identifier.

Because the token generated by the terminal device 10 may have a security threat, the UPF 30 may use the token generated by the terminal device as the input information for generating the first token, and update, by using the first token, the third token generated by the terminal device, thereby eliminating a potential security threat caused by a non-standard token generated by the terminal device.

Optionally, the first input information further includes a fourth token, and the fourth token is generated by the server 50. The fourth token is stored in the UPF 30, and the UPF may obtain the fourth token through query. Specifically, if the first input information includes the fourth token, the input parameter used when the first token is generated further includes the fourth token. For example, after generating the fourth token, the server 50 may send the fourth token to the UPF 30, the UPF may use the fourth token as the input parameter for generating the first token, and the UPF may further store the fourth token. In this way, when performing the verification, the UPF may further use the stored fourth token as the input parameter for generating the second token. Because the fourth token is sent by the server to the UPF 30, when storing the fourth token, the UPF may perform storage based on the service identifier, and certainly may further perform storage based on other information such as the identifier of the server. Correspondingly, when generating the first token, the UPF 30 may search for the stored fourth token based on information such as the service identifier or the identifier of the server.

Because the token generated by the server 50 may have a security threat, the UPF 30 may use, as the input of the first token, the token generated by the server, and update, by using the first token, the token generated by the server, thereby eliminating a potential security threat caused by a non-standard token generated by the server.

Optionally, the first input information further includes any one or more of the random number, the third token, and the fourth token.

In this embodiment of the present application, except the random number, the third token, and the fourth token that may be stored, another parameter for generating the token may each be dynamically obtained without being stored, so that storage costs of the UPF 30 may be reduced.

S23. Send the data packet when the first token is the same as the second token.

For example, after generating the second token, the UPF 30 compares the first token with the second token, and determines whether the first token is the same as the second token. If the first token is the same as the second token, the device that sends the data packet is legal, and the UPF 30 may continue to forward the data packet.

Specifically, if an implementation of S21 is S211, that is, the data packet is a data packet sent by the server 50 to the terminal device 10, the UPF 30 determines that the server is legal. For a specific implementation of S23, refer to S231 in FIG. 2, that is, the UPF 30 sends the data packet to the terminal device. Alternatively, if the implementation of S21 is S212, that is, the data packet is a data packet sent by the terminal device to the server, the UPF 30 determines that the terminal device is legal. For a specific implementation of S23, refer to S232 in FIG. 2, that is, the UPF 30 sends the data packet to the server 50.

If an implementation of the UPF 30 is S231, the data packet sent by the UPF first arrives at the access network, and then arrives at the terminal device.

It should be noted that, in this embodiment of the present application, verification of legality of the device that sends the data packet, for example, the server 50 or the terminal device 10, may be attempted by attempting to verify legality of the data packet. However, regardless of whether to attempt to verify legality of the server 50 or legality of the terminal device 10, a verification process is the same for the UPF 30. For example, if the implementation of S21 is S211, that is, the data packet is the data packet sent by the server 50 to the terminal device 10, in S22, the UPF 30 needs to attempt to verify the legality of the server that sends the data packet. Alternatively, if the implementation of S21 is S212, that is, the data packet is the data packet sent by the terminal device 10 to the server 50, in S22, the UPF 30 needs to attempt to verify the legality of the terminal device that sends the data packet.

In this embodiment of the present application, the UPF 30 generates the second token based on the identifier of the terminal device 10 and the service identifier, and attempts to verify the data packet by comparing whether the generated second token is consistent with the first token carried in the data packet, to determine whether the device that sends the data packet is legal. Because the token is associated with the identifier of the terminal device and the service identifier, the data packet verification fails as long as one of the token, the identifier of the terminal device, and the service identifier is incorrect. Even if an attacker steals the token, as the attacker cannot obtain the identifier of the terminal device 10 and the service identifier that are legal, the verification still fails. As a result, the attacker cannot disguise as a legal device to perform an attack, thereby enhancing network security, and improving network assurance.

Optionally, to further enhance security, in an implementation scenario of the foregoing embodiment, the method further includes:

generating, by the UPF, the first token, and storing the first token.

Furthermore, the generating a second token based on the first input information in step S22 may include:

when the stored first token is the same as the first token carried in the data packet, generating the second token based on the first input information.

For example, after receiving the data packet, the UPF first compares the stored first token with the first token stored in the data packet, to determine whether the stored first token and the first token stored in the data packet are the same. If the stored first token is different from the first token carried in the data packet, the first token carried in the data packet may be basically determined as incorrect, where the error may be caused in a transmission process, or the device that sends the data packet may steal a token, that is, the device that sends the data packet may be an illegal device. In this case, the UPF may directly determine that the verification fails without generating the second token. A simple preliminary verification process is added, so that the UPF 30 may preliminarily determine whether the device that sends the data packet is legal, and workload of the UPF 30 may be reduced to some extent. In addition, during the verification, the stored first token and the first token carried in the data packet are compared first. In this way, if second input information includes a random number, a forgery attack may still be resisted when the random number is leaked. The first token is compared again, to ensure that a communication entity is the same as a communication entity for which the first token is generated.

Certainly, if the stored first token is the same as the first token carried in the data packet, the UPF 30 may directly determine that the verification succeeds, and directly continue to forward the data packet, so that S22 does not need to be performed. Alternatively, to be more secure, if the stored first token is the same as the first token carried in the data packet, the UPF 30 may continue to generate the second token based on the first input information to perform the verification, so that security assurance may further be improved.

It is mentioned in the embodiment shown in FIG. 2 that if the terminal device 10 and the server 50 need to use the first token in the communication process, the UPF 30 needs to generate the first token in advance. The following describes, by using one embodiment, a method for generating the first token by the UPF 30.

Figure 3:
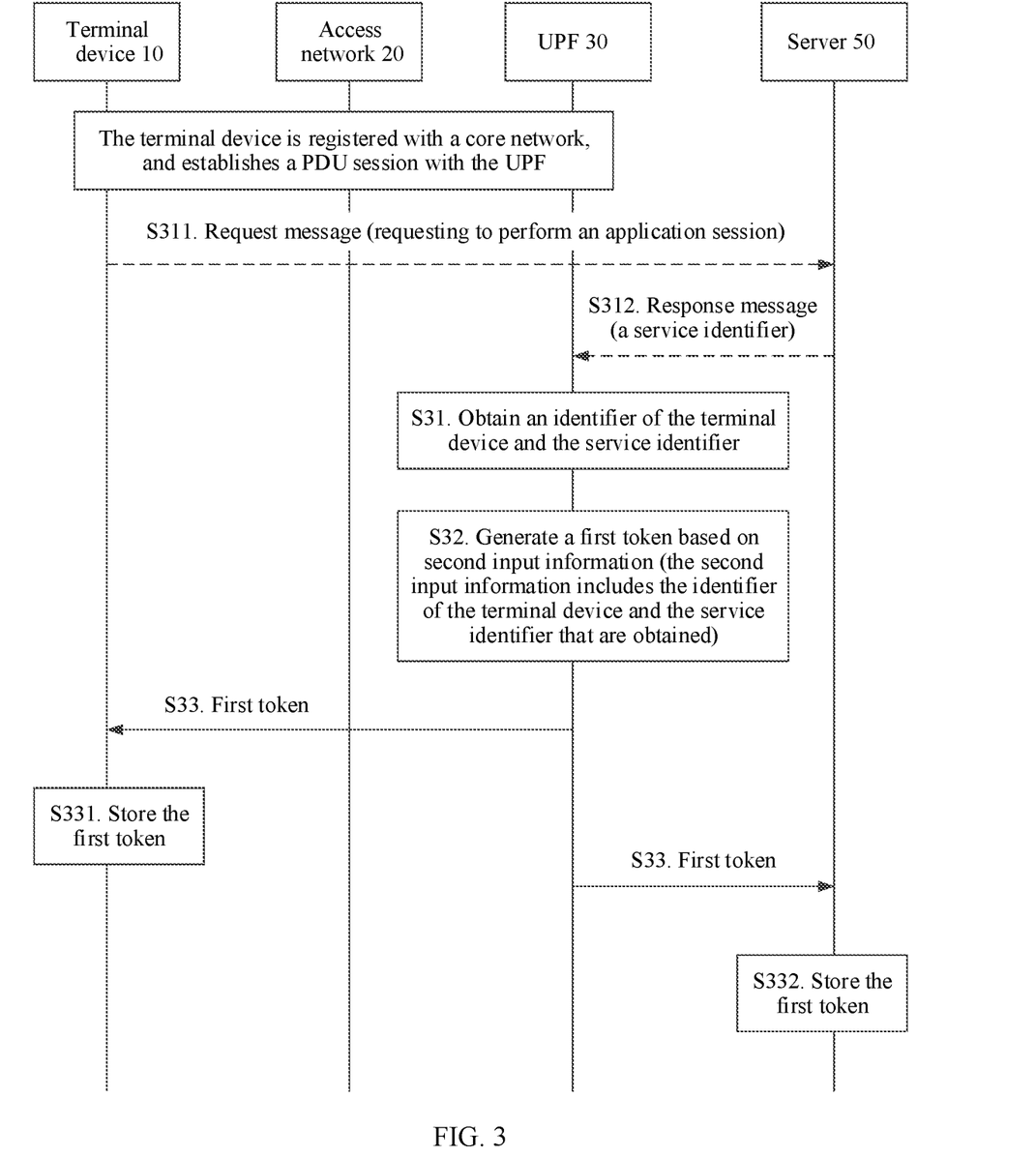
FIG. 3 is a flowchart of a token generation method according to an embodiment of the present application.

Referring to FIG. 3, an embodiment of the present application provides a token generation method, where the method may be implemented by a user plane function entity of a core network.

It should be noted that the method provided in the embodiment shown in FIG. 3 may be combined with the embodiment shown in FIG. 2. For example, the embodiment shown in FIG. 2 is performed after the method provided in the embodiment shown in FIG. 3 is completed. To be specific, the first token in the data packet in S21 is generated according to the embodiment shown in FIG. 3, and then data packet verification is performed by using the generated first token according to the embodiment shown in FIG. 2.

First, a terminal device 10 is registered with the core network, and a packet data unit (packet data unit, PDU) session is established between the terminal device and the UPF 30. Then, the terminal device 10 starts to access a server 50, where the data packet communicated between the terminal device and the server is forwarded by an access network 20 and the UPF 30.

S31. The UPF 30 obtains an identifier of the terminal device 10 and a service identifier.

For the identifier of the terminal device 10 and the service identifier, refer to related descriptions in the embodiment shown in FIG. 2.

In this embodiment of the present application, the UPF 30 may obtain the identifier of the terminal device 10 and the service identifier in different manners.

In an example, the UPF 30 obtains the identifier of the terminal device 10 when the PDU session between the terminal device 10 and the UPF is established. The service identifier may be sent by the server 50 to the UPF 30. For example, the terminal device 10 sends, to the server 50, a request message used to request to perform an application session, as shown in S311 in FIG. 3. After receiving the request message, the server 50 sends a response message to the terminal device 10, where the response message may carry the service identifier, as shown in S312 in FIG. 3. The response message needs to be transited by the UPF 30 and then arrives at the terminal device. Therefore, after receiving the response message sent by the server 50, the UPF 30 may obtain the service identifier carried in the response message, and then continue to send the response message to the terminal device 10. In this way, the UPF 30 obtains the service identifier.

S311 and S312 are merely optional manners in which the UPF 30 obtains the identifier of the terminal device 10 and the service identifier, and are not mandatory steps. Therefore, arrows used to indicate S311 and S312 are drawn in dashed lines in FIG. 3.

S32. The UPF 30 generates a first token based on second input information, where the second input information includes the identifier of the terminal device 10 and the service identifier that are obtained.

For example, the UPF 30 may use the second input information as input information for generating the first token, and generate the first token by using an authentication vector algorithm. The authentication vector algorithm has been described in the embodiment shown in FIG. 2.

The second input information includes the identifier of the terminal device 10 and the service identifier. The service identifier includes service type indication information and an identifier of the server 50. To be specific, in this implementation, generation of the first token is bound to both communication parties and a service, to ensure association between the terminal device 10, the server 50, and the service, so that another terminal device cannot counterfeit the terminal device 10, thereby resisting a spoof attack.

Optionally, the second input information further includes a salt, where the salt may be a random number. The random number is added to input information, so that the generated token is unique and is more difficult to steal.

If the second input information includes the random number, the UPF 30 needs to first obtain the random number. The following describes several manners in which the UPF 30 obtains the random number. It should be noted that the following several manners are merely examples, and the manners in which the random number is obtained in this embodiment of the present application are not limited to the following several manners.

A. The random number is obtained based on the identifier of the terminal device 10.

In an example, the UPF 30 may generate the random number based on the identifier of the terminal device 10, so that the UPF may generate different random numbers for identifiers of different terminal devices.

In another example, the UPF 30 may maintain a random number for an identifier of each terminal device 10. For example, the UPF pre-stores a mapping relationship between an identifier of a terminal device 10 and a random number. Therefore, when generating the first token, the UPF 30 may search, based on the stored mapping relationship, for a random number corresponding to the identifier of the terminal device, and this manner is relatively simple.

In this manner, if the UPF 30 pre-stores the mapping relationship between an identifier of a terminal device 10 and a random number, the UPF may periodically update random numbers corresponding to identifiers of all terminal devices in the stored mapping relationship, or periodically update random numbers corresponding to identifiers of some terminal devices in the stored mapping relationship. In this way, freshness of the stored random numbers may be ensured, to be more secure.

In addition, in this manner, different random numbers may be used for identifiers of different terminal devices, thereby further enhancing encryption security.

B. The random number is obtained based on the service identifier.

In an example, the UPF 30 may generate the random number based on the service identifier. In this way, the UPF 30 generates different random numbers for different service identifiers.

In another example, the UPF 30 may maintain a random number for each service identifier. For example, the UPF 30 pre-stores a mapping relationship between a service identifier and a random number. Therefore, when generating the first token, the UPF 30 may search, based on the stored mapping relationship, for a random number corresponding to the service identifier, and this manner is relatively simple.

In this manner, if the UPF 30 pre-stores the mapping relationship between a service identifier and a random number, the UPF may periodically update random numbers corresponding to all service identifiers in the stored mapping relationship, or periodically update random numbers corresponding to some service identifiers in the stored mapping relationship. In this way, freshness (recentness) of the stored random numbers may be ensured, to be more secure.

In addition, in this manner, different random numbers may be used for different service identifiers, thereby further enhancing the encryption security.

Manner A and manner B may further be combined, that is, the random number may be generated based on the identifier of the terminal device 10 and the service identifier. Alternatively, the UPF 30 may maintain a random number in advance for a service identifier and an identifier of a terminal device, that is, the UPF 30 pre-stores a mapping relationship between a service identifier, an identifier of a terminal device 10, and a random number. Therefore, when generating the first token, the UPF 30 may search, based on the stored mapping relationship, for a random number corresponding to the service identifier and the identifier of the terminal device, and this manner is relatively simple.

C. A fixed random number is stored.

In this manner, the UPF 30 may merely store one random number, and the random number may be used as a part of the second input information for an identifier of any terminal device or any service identifier. A data volume stored in the UPF is relatively small, so that storage space of the UPF 30 may be reduced while security is improved.

In this manner, the UPF 30 may periodically update the stored random number. In this way, freshness (recentness) of the stored random number is ensured, to be more secure.

In this embodiment of the present application, a random number is introduced into the input information for generating the first token, thereby ensuring freshness of a token generated by each new session, reducing cases in which a same token is generated, and effectively resisting a replay attack.

Optionally, the second input information further includes a third token, and the third token is generated by the terminal device. After generating the third token, the terminal device may send the third token to the UPF 30. For example, the terminal device 10 may add the third token to a request message in S311. The request message is sent to the server, but is transited by the UPF and then arrives at the server 50.

Therefore, after receiving the request message sent by the terminal device, the UPF 30 may extract the third token carried in the request message, and then send the response message from which the third token is removed to the server 50. In this way, the UPF 30 obtains the third token. In addition to using the third token as the input parameter for generating the first token, the UPF 30 may further store the third token, to attempt to verify the legality of the device in a subsequent verification process. A process of performing verification by using the third token is described in the embodiment shown in FIG. 2.

Because the token generated by the terminal device 10 may have a security threat, the UPF 30 may use the token generated by the terminal device as the input information for generating the first token, and update, by using the first token, the third token generated by the terminal device, thereby eliminating a potential security threat caused by a non-standard token generated by the terminal device.

Optionally, the second input information further includes a fourth token, and the fourth token is generated by the server 50. After generating the fourth token, the server 50 may send the fourth token to the UPF 30. For example, the server may add the fourth token to the response message in S312, and the UPF 30 obtains the fourth token. The response message is sent to the terminal device 10, but is transited by the UPF 30 and then arrives at the terminal device 10. Therefore, after receiving the response message sent by the server, the UPF 30 may extract the fourth token carried in the response message, and then send the response message from which the fourth token is removed to the terminal device. In this way, the UPF 30 obtains the fourth token. In addition to using the fourth token as the input parameter for generating the first token, the UPF 30 may further store the fourth token, to attempt to verify the legality of the device in the subsequent verification process. A process of performing verification by using the fourth token is described in the embodiment shown in FIG. 2.

Because the token generated by the server 50 may have a security threat, the UPF 30 may use, as the input of the first token, the token generated by the server, and update, by using the first token, the token generated by the server, thereby eliminating a potential security threat caused by a non-standard token generated by the server.

Optionally, the second input information further includes one or more of the random number, the third token, and the fourth token.

It should be noted that, a category and a quantity of parameters included in the second input information may be the same as a category and a quantity of parameters included in the first input information described in the embodiment shown in FIG. 2.

In this embodiment of the present application, except the random number, the third token, and the fourth token that may be stored, another parameter included in the second input information may be dynamically obtained without being stored, so that storage costs of the UPF 30 may be reduced.

S33. The UPF sends the first token to the terminal device 10 and the server 50 that provides the service for the terminal device.

Correspondingly, the terminal device 10 and the server 50 receive the first token.

The UPF 30 sends the first token to the terminal device 10, and the UPF 30 sends the first token to the server 50, where the two steps may be performed simultaneously. Alternatively, the UPF 30 may first send the first token to the terminal device 10 and then send the first token to the server 50. Alternatively, the UPF 30 may first send the first token to the server 50 and then send the first token to the terminal device. This embodiment of the present application is not limited to any one such technique.

The service is a service corresponding to the service identifier in S31. For example, the service is a service indicated by the service type indication information included in the service identifier.

In S33, after generating the first token, the UPF 30 sends the first token to the terminal device 10 and the server 50, so that the terminal device and the server may add the first token to the data packet in the subsequent communication process, and the UPF attempts to verify the legality of the terminal device or the server based on the first token.

For example, the UPF 30 sends the data packet to the terminal device 10, where the data packet carries the first token. Optionally, the data packet may further carry the service identifier. Specifically, the service identifier and the first token may be stored in a hypertext transfer protocol (HTTP) or transmission control protocol (TCP) option field of the data packet. After receiving the data packet, the terminal device 10 may store the first token, as shown in S331 in FIG. 3. The terminal device 10 may further store the service identifier.

For another example, the UPF 30 sends the data packet to the server 50, where the data packet carries the first token. Optionally, the data packet may further carry the service identifier. Specifically, the service identifier and the first token may be stored in the HTTP or TCP option field of the data packet. After receiving the data packet, the server may store the first token, as shown in S332 in FIG. 3. The server 50 may further store the service identifier.

In this embodiment of the present application, after generating the first token, in addition to sending the first token to the terminal device and the server, the UPF may further locally store the first token. Certainly, the UPF may further choose not to store the first token. This embodiment of the present application is not limited in this respect.

After the UPF 30 generates the first token, the server 50 and the terminal device 10 send the first token to the UPF by using the data packet in the subsequent communication process, so that the UPF attempts to verify the legality of the server or the terminal device based on the first token. A specific verification manner of the UPF 30 is described in the embodiment shown in FIG. 2, and details are not described.

An apparatus according to an embodiment of the present application is described in the following with reference to the accompanying drawings.

Figure 4:
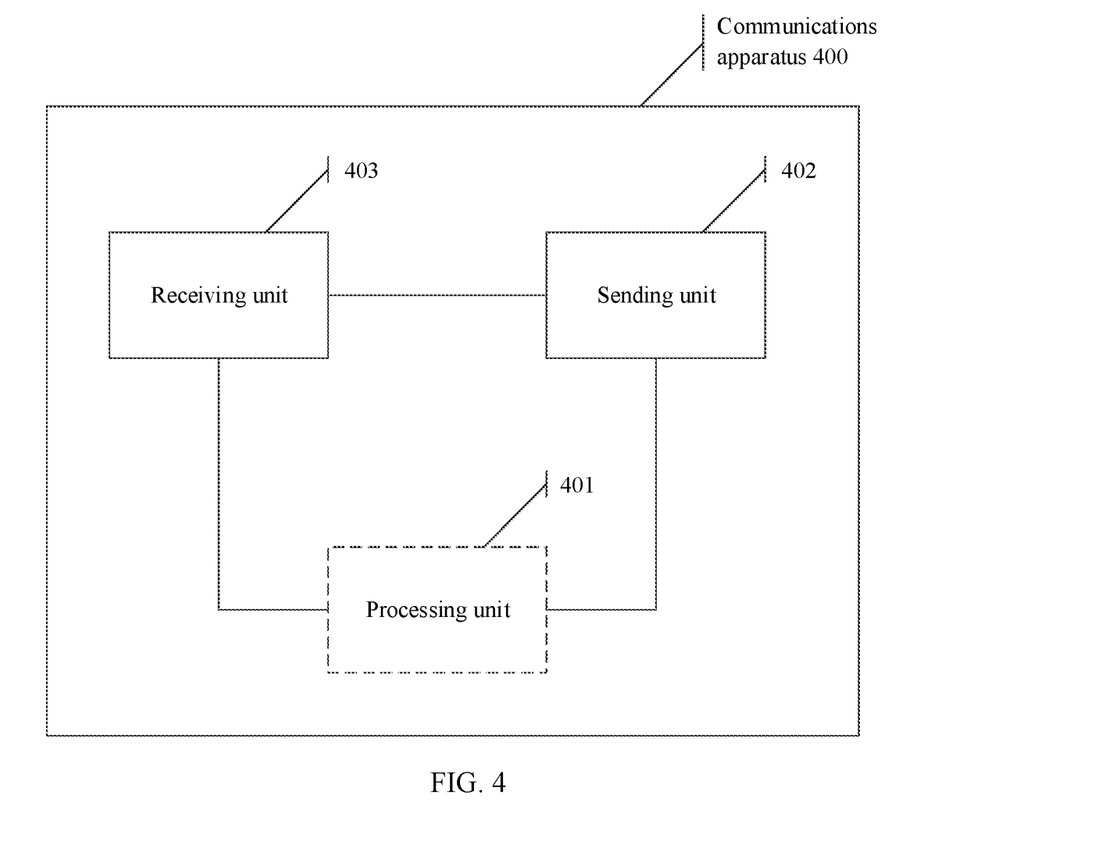
FIG. 4 and FIG. 5 are two schematic structural diagrams of communications apparatuses according to embodiments of the present application.

FIG. 4 is a schematic structural diagram of a communications apparatus 400. The communications apparatus 400 may implement functions of the UPF 30 in the foregoing. The communications apparatus 400 may include a processing unit 401, a sending unit 402, and a receiving unit 403.

The processing unit 401 may be configured to perform S22 and S23 (a process of comparing the first token with the second token in S23 is performed by the processing unit 401) in the embodiment shown in FIG. 2. Alternatively, the processing unit 401 may be configured to perform S31 (if the UPF 30 obtains the identifier of the terminal device 10 and the service identifier by receiving a message in S31, the processing unit 401 is configured to parse the received message to obtain the identifier of the terminal device and the service identifier) and the S32 in the embodiment shown in FIG. 3, and/or may be configured to support another process of the technology described in this specification.

The sending unit 402 may be configured to perform S23 in the embodiment shown in FIG. 2, or S33 in the embodiment shown in FIG. 3, and/or may be configured to support another process of the technology described in this specification.

The receiving unit 403 may be configured to perform S21 in the embodiment shown in FIG. 2. Alternatively, if the UPF 30 obtains the identifier of the terminal device 10 and the service identifier by receiving a message in S31, the receiving unit 403 may further be configured to perform S31 in the embodiment shown in FIG. 3, and/or may be configured to support another process of the technology described in this specification.

All related content of steps in the foregoing methods and embodiments may be cited in function descriptions of corresponding function modules, and details are not described herein again.

In this embodiment of the present application, the communications apparatus 400 is presented in a form in which function modules are divided in correspondence with functions, or may be presented in a form in which function modules are divided in an integrated manner. The "module" herein may refer to an application-specific integrated circuit (application-specific integrated circuit, ASIC), a processor for executing one or more software or firmware programs, a memory, an integrated logic circuit, and/or another component that may provide the foregoing functions.

Figure 5:
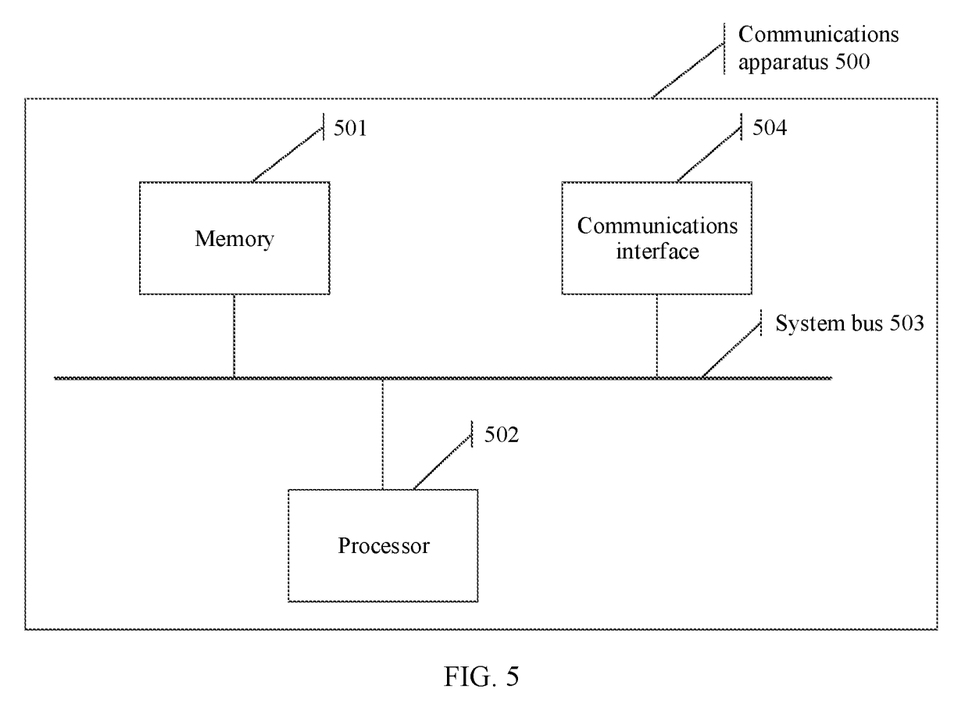

In a simple embodiment, a person skilled in the art may figure out that the communications apparatus 400 may further be implemented by using a structure shown in FIG. 5.

As shown in FIG. 5, the communications apparatus 500 may include: a non-transitory memory 501, a processor 502, a system bus 503, and a communications interface 504. The processor 502, the memory 501, and the communications interface 504 are connected by using the system bus 503. The memory 501 is configured to store a computer executable instruction. When the communications apparatus 500 runs, the processor 502 executes the computer executable instruction stored in the memory 501, so that the communications apparatus 500 is enabled to perform the data packet verification method provided in the embodiment shown in FIG. 2 or the token generation method provided in the embodiment shown in FIG. 3. For specifics of the data packet verification method or the token generation method, refer to the foregoing descriptions and related descriptions in the accompanying drawings, and details are not described herein again. The communications interface 504 may be a transceiver, or an independent receiver and an independent transmitter.

In an example, the sending unit 402 may correspond to the communications interface 504 in FIG. 5, the receiving unit 403 may further correspond to the communications interface 504 in FIG. 5, and the processing unit 401 may be embedded or independent of the memory 501 of the communications apparatus 500 in a hardware form/software form.

Optionally, the communications apparatus 500 may be a field-programmable gate array (FPGA), an application-specific integrated chip (ASIC), a system on chip (SoC), a central processing unit (CPU), a network processor (NP), a digital signal processing circuit (DSP), or a micro controller unit (MCU), or a programmable controller (PLD) or another integrated chip may be used. Alternatively, the communications apparatus 500 may further be an independent network element, for example, the UPF 30.

The communications apparatus 400 or the communications apparatus 500 provided in the embodiments of the present application may be configured to perform the data packet verification method or the token generation method in the foregoing. Therefore, for technical effects that may be obtained by the communications apparatus 400 or the communications apparatus 500, refer to the foregoing method embodiments, and details are not described herein again.

In this embodiment of the present application, during an attempt to verify the data packet sent by the device, a token is generated based on the identifier of the terminal device 10 and the service identifier carried in the data packet, and whether the device is legal is determined by comparing whether the generated token is consistent with the token carried in the data packet. To be specific, the token is associated with the identifier of the terminal device 10 and the service identifier, and the verification fails as long as one of the token, the identifier of the terminal device, and the service identifier is incorrect. Therefore, even if an attacker steals the token, as the attacker cannot obtain the identifier of the terminal device 10 and the service identifier that are legal, the verification still fails. As a result, the attacker cannot disguise as a legal device to perform an attack. The technical solutions provided in the embodiments of the present application enhance network security, and improves network assurance.

The embodiments of the present application are described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of another programmable data processing device generate an apparatus configured to implement a specified function in one or more processes in the flowcharts and/or in one or more blocks in the block diagrams.

The foregoing embodiments may be implemented completely or partially by using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on the computer, the processes or functions according to the embodiments of the present application are completely or partially generated. The computer may be a general-purpose computer, a special-purpose computer, a computer network, or another programmable apparatus. The computer instructions may be stored in a computer-readable storage medium, or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

A person skilled in the art may make various modifications and variations to the embodiments of the present application without departing from the spirit and scope of this application. This application is intended to cover these and other modifications and variations to the embodiments of the present application provided that they fall within the scope defined by the following claims and their equivalent technologies.

What is claimed is:

1. A data packet verification method, comprising:
receiving a data packet of a terminal device of a type that performs data interaction with a user plane function entity, wherein the data packet carries a first token and a service identifier, and the service identifier includes a service type indicator used to indicate a type of a service to which the data packet belongs, the service identifier further including an identifier of a server that provides the indicated type of service;
obtaining first input information based on the data packet, and generating a second token based on the first input information, wherein the first input information comprises an identifier of the terminal device, the service identifier, and a third token generated by the terminal device and obtained by the user plane function entity; and
using the first token to update the third token at the terminal device,
wherein generating the second token based on the first input information includes using the third token as an input parameter to generate the second token; and
sending the data packet in response to the first token being the same as the second token.

2. The method according to claim 1, wherein before the receiving a data packet of a terminal device, the method further comprises:
obtaining second input information, wherein the second input information comprises the identifier of the terminal device and the service identifier;
generating the first token based on the second input information; and
sending the first token to the terminal device and the server that provides the service for the terminal device.

3. The method according to claim 2, wherein
the second input information further comprises a random number, and the first input information further comprises the random number; or
the second input information further comprises the third token, and the third token is generated by the terminal device; or
the second input information further comprises a fourth token, the first input information further comprises the fourth token, and the fourth token is generated by the server; or
the second input information further comprises the third token and the fourth token, and the first input information further comprises the third token and the fourth token; or
the second input information further comprises the random number, the third token, and the fourth token, and the first input information further comprises the random number, the third token, and the fourth token; or
the second input information further comprises the random number and the third token, and the first input information further comprises the random number and the third token; or the second input information further comprises the random number and the fourth token, and the first input information further comprises the random number and the fourth token.

4. The method according to claim 3, wherein the method further comprises:
obtaining the random number based on the identifier of the terminal device; or
obtaining the random number based on the service identifier.

5. The method according to claim 2, further comprising performing, after the generating the first token based on the second input information, operations comprising storing the first token; and
the generating a second token based on the first input information comprises:
in response to the stored first token being the same as the first token carried in the data packet, generating the second token based on the first input information.

6. The method according to claim 1, wherein the method further comprises:
discarding the data packet in response to the first token being different from the second token.

7. The method of claim 1 further including obtaining the third token based on the identifier of the terminal device and/or the service identifier.

8. A communications apparatus, comprising: a memory, a communications interface, and at least one processor; wherein the memory is configured to store computer executable program code; the at least one processor is coupled to the memory and the communications interface, the program code stored in the memory including at least one instruction, and when the at least one processor executes the instruction, the at least one instruction enables the communications apparatus to perform operations comprising:
receiving a data packet of a terminal device of a type that performs data interaction with a user plane function entity, wherein the data packet carries a first token and a service identifier, and the service identifier includes a service type indicator used to indicate a type of a service to which the data packet belongs, the service identifier further including an identifier of a server that provides the indicated type of service;
obtaining first input information based on the data packet, and generating a second token based on the first input information, wherein the first input information comprises an identifier of the terminal device, the service identifier and a third token generated by the terminal device and obtained by the user plane function entity; and
using the first token to update the third token at the terminal device,
wherein generating the second token based on the first input information includes using the third token as an input parameter to generate the second token; and
sending the data packet in response to the first token is the same as the second token.

9. The communications apparatus according to claim 8, wherein the operations further comprise:
obtaining second input information, wherein the second input information comprises the identifier of the terminal device and the service identifier;
generating the first token based on the second input information; and
sending the first token to the terminal device and the server that provides the indicated type of service for the terminal device.

10. The communications apparatus according to claim 9, wherein
the second input information further comprises a random number, and the first input information further comprises the random number; or
the second input information further comprises the third token, and the third token is generated by the terminal device; or
the second input information further comprises a fourth token, the first input information further comprises the fourth token, and the fourth token is generated by the server; or
the second input information further comprises the third token and the fourth token, and the first input information further comprises the third token and the fourth token; or
the second input information further comprises the random number, the third token, and the fourth token, and the first input information further comprises the random number, the third token, and the fourth token; or
the second input information further comprises the random number and the third token, and the first input information further comprises the random number and the third token; or
the second input information further comprises the random number and the fourth token, and the first input information further comprises the random number and the fourth token.

11. The communications apparatus according to claim 10, wherein the operations further comprise:
obtaining the random number based on the identifier of the terminal device; or
obtaining the random number based on the service identifier.

12. The communications apparatus according to claim 8, wherein the operations further comprise:
discarding the data packet in response to the first token being different from the second token.

13. The communications apparatus according to claim 8, wherein the operations further comprise: storing the first token; and
the generating a second token based on the first input information comprises:
in response to the stored first token being the same as the first token carried in the data packet, generating the second token based on the first input information.

14. The communications apparatus of claim 3-8 wherein the at least one instruction further enables the communications apparatus to perform operations comprising obtaining the third token based on the identifier of terminal device and/or the service identifier.

15. A non-transitory computer readable storage medium storing an instruction, that when executed by a computer, enables the computer to perform functions comprising:
receiving a data packet of a terminal device of a type that performs data interaction with a user plane function entity, wherein the data packet carries a first token and a service identifier, and the service identifier includes a service type indicator used to indicate a type of a service to which the data packet belongs, the service identifier further including an identifier of a server that provides the indicated type of service;
obtaining first input information based on the data packet, and generating a second token based on the first input information, wherein the first input information comprises an identifier of the terminal device, the service identifier and a third token generated by the terminal device and obtained by the user plane function entity; and
using the first token to update the third token at the terminal device,
wherein generating the second token based on the first input information includes using the third token as an input parameter to generate the second token; and
sending the data packet in response to the first token is the same as the second token.

16. The medium according to claim 15, wherein the functions further comprise:
obtaining second input information, wherein the second input information comprises the identifier of the terminal device and the service identifier;
generating the first token based on the second input information; and
sending the first token to the terminal device and the server that provides the service for the terminal device.

17. The medium according to claim 16, wherein
the second input information further comprises a random number, and the first input information further comprises the random number; or
the second input information further comprises the third token generated by the terminal device; or
the second input information further comprises a fourth token, the first input information further comprises the fourth token, and the fourth token is generated by the server; or
the second input information further comprises the third token and the fourth token, and the first input information further comprises the third token and the fourth token; or
the second input information further comprises the random number, the third token, and the fourth token, and the first input information further comprises the random number, the third token, and the fourth token; or
the second input information further comprises the random number and the third token, and the first input information further comprises the random number and the third token; or
the second input information further comprises the random number and the fourth token, and the first input information further comprises the random number and the fourth token.

18. The medium according to claim 17, wherein the functions further comprise:
obtaining the random number based on the identifier of the terminal device; or
obtaining the random number based on the service identifier.

19. The medium according to claim 15, wherein the functions further comprise:
discarding the data packet in response to the first token being different from the second token.

* * * * *